(12) United States Patent
Song et al.

(10) Patent No.: US 9,947,930 B2
(45) Date of Patent: Apr. 17, 2018

(54) POSITIVE ACTIVE MATERIAL, METHOD OF PREPARING THE SAME, POSITIVE ELECTRODE, AND LITHIUM BATTERY

(71) Applicant: SAMSUNG SDI CO., LTD., Yongin-si, Gyeonggi-do (KR)

(72) Inventors: Jay-Hyok Song, Yongin-si (KR); Byong-Yong Yu, Yongin-si (KR); Andrei Kapylou, Yongin-si (KR); Sol Choi, Yongin-si (KR); Yong-Chan You, Yongin-si (KR); Sun-Ho Kang, Yongin-si (KR)

(73) Assignee: SAMSUNG SDI CO., LTD., Yongin-Si, Gyeonggi-Do (KR)

(*) Notice: Subject to any disclaimer, the term of this patent is extended or adjusted under 35 U.S.C. 154(b) by 512 days.

(21) Appl. No.: 14/537,038

(22) Filed: Nov. 10, 2014

(65) Prior Publication Data
US 2015/0214550 A1    Jul. 30, 2015

(30) Foreign Application Priority Data

Jan. 29, 2014 (KR) .................. 10-2014-0011737

(51) Int. Cl.
| | |
|---|---|
| H01M 4/36 | (2006.01) |
| H01M 4/1315 | (2010.01) |
| H01M 4/13915 | (2010.01) |
| H01M 4/62 | (2006.01) |
| H01M 10/052 | (2010.01) |
| H01M 4/525 | (2010.01) |

(Continued)

(52) U.S. Cl.
CPC ......... *H01M 4/628* (2013.01); *H01M 4/1315* (2013.01); *H01M 4/13915* (2013.01); *H01M 4/366* (2013.01); *H01M 4/505* (2013.01); *H01M 4/525* (2013.01); *H01M 10/052* (2013.01); *H01M 2004/021* (2013.01); *H01M 2004/028* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 7,314,682 B2 | 1/2008 | Thackeray et al. | |
| 2005/0106462 A1* | 5/2005 | Jordy ................. | H01M 4/1315 429/231.1 |
| 2009/0309063 A1* | 12/2009 | Paulsen .............. | C01G 45/1228 252/182.33 |

FOREIGN PATENT DOCUMENTS

| | | | |
|---|---|---|---|
| JP | 2002260660 A | * | 9/2002 |
| JP | 2013-089519 A | | 5/2013 |
| KR | 10-2013-0053171 A | | 5/2013 |

OTHER PUBLICATIONS

"Enhanced overcharge performance of nano-LiCoO2 by novel Li3VO4 surface coatings" published by Pu et al. Nanoscale (2012) 4, 6743-6747.*

(Continued)

*Primary Examiner* — Basia A Ridley
*Assistant Examiner* — Heng M. Chan
(74) *Attorney, Agent, or Firm* — Lee & Morse, P.C.

(57) ABSTRACT

A positive active material, a method of preparing the same, and a lithium battery including the positive active material, the positive active material including a core, the core including an overlithiated lithium transition metal oxide; and a coating layer on the core, the coating layer including $Li_3VO_4$.

18 Claims, 5 Drawing Sheets

(51) Int. Cl.
*H01M 4/505* (2010.01)
*H01M 4/02* (2006.01)

(56) References Cited

OTHER PUBLICATIONS

Xiong Pu et al, "Functional surface modifications on nanostructured $LiCoO_2$ with lithium vanadates", Journal of Nanoparticle research, 2012, vol. 14, Springer.

* cited by examiner

POSITIVE ACTIVE MATERIAL, METHOD OF PREPARING THE SAME, POSITIVE ELECTRODE, AND LITHIUM BATTERY

CROSS-REFERENCE TO RELATED APPLICATION

Korean Patent Application No. 10-2014-0011737, filed on Jan. 29, 2014, in the Korean Intellectual Property Office, and entitled: "Positive Active Material, Method Of Preparing The Same, Positive Electrode, And Lithium Battery," is incorporated by reference herein in its entirety.

BACKGROUND

1. Field

Embodiments relate to a positive active material, a method of preparing the same, a positive electrode, and a lithium battery.

2. Description of the Related Art

Transition metal oxides, e.g., $LiNiO_2$, $LiCoO_2$, $LiMn_2O_4$, $LiFePO_4$, $LiNi_xCo_{1-x}O_2$ (where $0 \le x \le 1$), and $LiNi_{1-x-y}Co_xMn_yO_2$ (where $0 \le x \le 0.5$ and $0 \le y \le 0.5$), or lithium oxides of these metal compounds may be used as positive material materials for lithium batteries. Such positive active materials may have a limited electric capacity.

SUMMARY

Embodiments are directed to a positive active material, a method of preparing the same, a positive electrode, and a lithium battery.

The embodiments may be realized by providing a positive active material including a core, the core including an overlithiated lithium transition metal oxide; and a coating layer on the core, the coating layer including $Li_3VO_4$.

The overlithiated lithium transition metal oxide may be represented by Formula 1:

$$Li[Li_aNi_bCo_cMn_dM_f]O_{2-x}F_x$$ [Formula 1]

wherein, in Formula 1, M comprises at least one selected from titanium (Ti), vanadium (V), aluminum (Al), magnesium (Mg), chromium (Cr), iron (Fe), zirconium (Zr), rhenium (Re), boron (B), germanium (Ge), ruthenium (Ru), tin (Sn), niobium (Nb), molybdenum (Mo), and platinum (Pt), and a, b, c, d, f, and x satisfy the following relations: $a+b+c+d+f=1$; $0<a<1$; $0<b<1$; $0<c<1$; $0<d<1$; $0 \le f<1$; and $0<x<0.1$.

In Formula 1, $f>0$ and M may comprise at least one selected from Ti, V, Al, Mg, Cr, Fe, and Zr.

In Formula 1, a, b, c, d, and f may satisfy the following relations: $0.1<a<0.25$, $0.1<b<0.4$, $0<c<0.2$, $f=0$, and $0.8<(2a+b)/d<1.2$.

The overlithiated lithium transition metal oxide may have an average particle diameter of about 10 nm to about 500 μm.

The coating layer may be an island-type discontinuous coating layer.

The core may include secondary particles including agglomerated primary particles.

The coating layer may be on a defective surface region of primary particles of the core.

The coating layer may include coating particles that include the $Li_3VO_4$.

The coating particles may have an average particle diameter of about 10 nm to about 100 nm.

An amount of vanadium in $Li_3VO_4$ of the coating layer may be less than about 1.25 mole %, based on 1 mole of total transition metal in the core.

The embodiments may be realized by providing a lithium battery including a positive electrode, the positive electrode including the positive active material according to an embodiment.

The embodiments may be realized by providing a method of preparing a positive active material, the method including mixing a transition metal precursor, a lithium precursor, a fluorine compound, and a vanadium source to prepare a mixed starting material for preparing an overlithiated lithium transition metal oxide; and thermally treating the mixed starting material.

The transition metal precursor may include $Ni_bCo_cMn_dM_f(OH)_y$, where $b+c+d++f=1$, $0<b<1$, $0<c<1$, $0<d<1$, $0 \le f<1$, $y=2\pm0.2$, and M comprises at least one selected from titanium (Ti), vanadium (V), aluminum (Al), magnesium (Mg), chromium (Cr), iron (Fe), zirconium (Zr), rhenium (Re), boron (B), germanium (Ge), ruthenium (Ru), tin (Sn), neodymium (Nb), molybdenum (Mo), and platinum (Pt).

In the $Ni_bCo_cMn_dM_f(OH)_y$, $f=0$.

The lithium precursor may include at least one selected from $LiOH$ and $Li_2Co_3$.

The fluorine compound may include at least one selected from lithium fluoride (LiF), magnesium fluoride ($MgF_2$), strontium fluoride ($SrF_2$), beryllium fluoride ($BeF_2$), calcium fluoride ($CaF_2$), ammonium fluoride ($NH_4F$), ammonium bifluoride ($NH_4HF_2$), and ammonium hexafluoroaluminate ($(NH_4)_3AlF_6$).

The vanadium source may include at least one selected from ammonium metavanadate ($NH_4VO_3$), sodium metavanadate ($NaVO_3$), potassium metavanadate ($KVO_3$), vanadium oxide ($V_2O_5$, $V_2O_4$, $V_2O_3$, or $V_3O_4$), vanadium oxytrichloride ($VOCl_3$), vanadium tetrachloride ($VCl_4$), and vanadium trichloride ($VCl_3$).

Thermally treating the mixed starting material may be performed in air and at a temperature of about 400° C. to about 1,000° C.

Thermally treating the mixed starting material may be performed at a temperature of about 650° C. to about 900° C.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
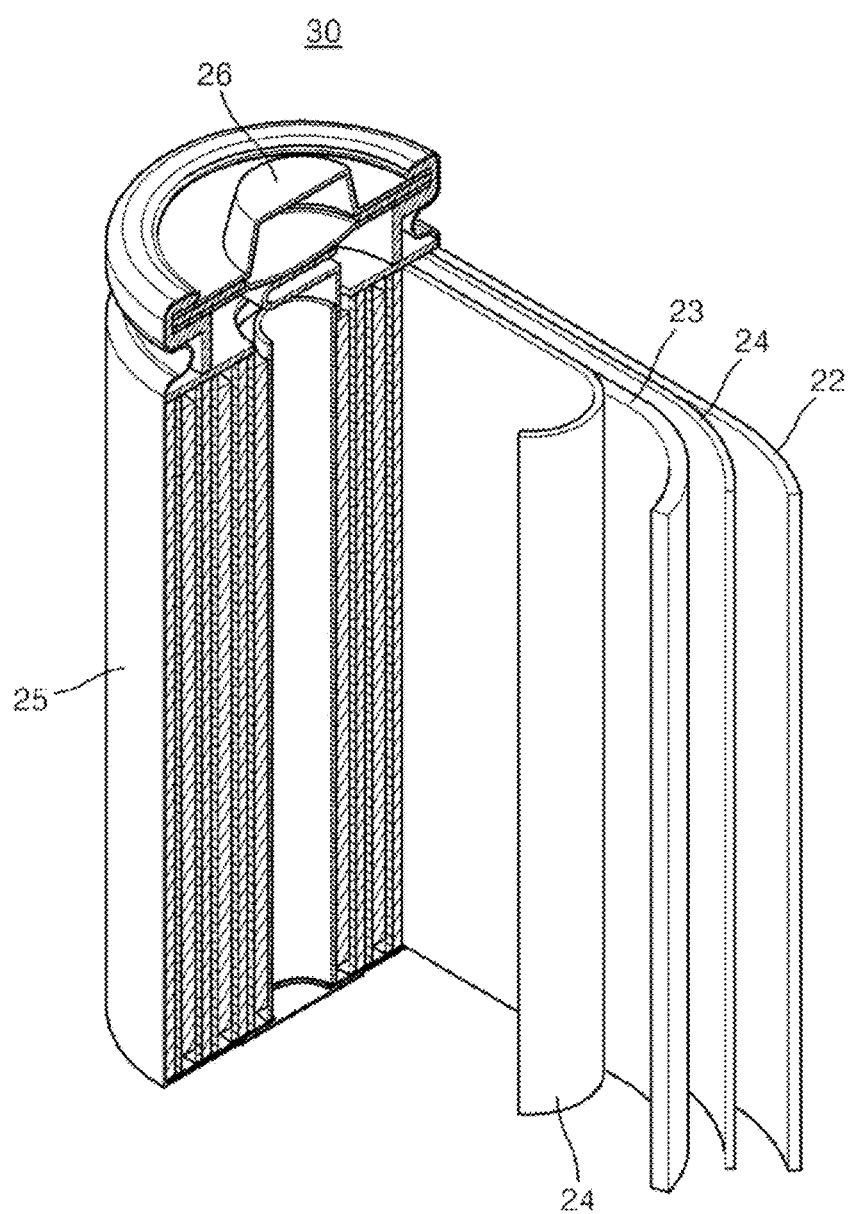
FIG. 1 illustrates a schematic perspective view of a structure of a lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

According to an embodiment, a positive active material may include a core (including an overlithiated lithium transition metal oxide), and a coating layer (including $Li_3VO_4$) on the core.

In an implementation, the overlithiated lithium transition metal oxide may be represented by Formula 1 below.

$$Li[Li_aNi_bCo_cMn_dM_f]O_{2-x}F_x \quad \text{[Formula 1]}$$

In Formula 1, above, M may include at least one selected from titanium (Ti), vanadium (V), aluminum (Al), magnesium (Mg), chromium (Cr), iron (Fe), zirconium (Zr), rhenium (Re), boron (B), germanium (Ge), ruthenium (Ru), tin (Sn), niobium (Nb), molybdenum (Mo), and platinum (Pt). a, b, c, d, f, and x may satisfy the following relations: $a+b+c+d+f=1$; $0<a<1$; $0<b<1$; $0<c<1$; $0<d<1$; $0\leq f<1$; and $0<x<0.1$.

The overlithiated lithium transition metal oxide may be in the form of, e.g., a composite having a layered structure, a solid solution, or a combination thereof.

In the overlithiated lithium transition metal oxide, a $LiM'O_2$ phase (in which M' may include Ni, Co, Mn, and/or other transition metals M) and a $Li_2MnO_3$ phase may be mixed. Similar to a structure of a $LiM'O_2$ layer, the $Li_2MnO_3$ phase may have a stack structure of alternating transition metal layers and Li ion layers, wherein one third of Mn ions in the transition metal layers are substituted with Li ions. Due to the substitution with lithium ions in the transition metal layers, the $Li_2MnO_3$-$LiM'O_2$-based positive active material of Formula 1 may help ensure high capacity.

In an implementation, M in Formula 1 above may include at least one selected from of Ti, V, Al, Mg, Cr, Fe, and Zr.

In an implementation, a, b, c, d, and f of Formula 1 may satisfy the following relations: $0.1<a<0.25$, $0.1<b<0.4$, $0<c<0.2$, $f=0$, and $0.8<(2a+b)/d<1.2$. When these conditions are satisfied, the overlithiated lithium transition metal oxide may exhibit high capacity and may have improved lifetime characteristics.

The overlithiated lithium transition metal oxide may be in the form of particles having an average particle diameter of about 10 nm to about 500 μm. In an implementation, the overlithiated lithium transition metal oxide may have an average particle diameter of about 10 nm to about 100 μm, e.g., about 10 nm to about 50 μm. When the average particle diameter of the overlithiated lithium transition metal oxide is within these ranges, a lithium battery with improved physical characteristics may be obtained.

In an implementation, the overlithiated lithium transition metal oxide may be in the form of nanoparticles having an average particle diameter of, e.g., about 500 nm or less, about 200 nm or less, about 100 nm or less, about 50 nm or less, or about 20 nm or less. When the average particle diameter of the overlithiated lithium transition metal oxide is within these nano-sized ranges, a positive electrode plate may have an improved mixture density, which may be advantageous for high rate discharge characteristics, and may have a reduced specific surface area with less reactivity to an electrolyte to thus improve cycle characteristics.

The overlithiated lithium transition metal oxide may include primary particles. In an implementation, the lithium transition metal oxide may include secondary particles resulting from agglomeration or binding of the primary particles with themselves or with another active material. For example, the secondary particles may be or may include agglomerations of the primary particles alone or with another active material.

In an implementation, the core of the positive active material may include one-body particles that include only primary particles of the overlithiated lithium transition metal oxide, or may include secondary particles resulting from agglomeration of the primary particles of the overlithiated lithium transition metal oxide.

As used herein, the "average particle diameter" may be represented as "D50", which refers to a particle size corresponding to 50% of the cumulative distribution in which the total particles are accumulated from particles of the smallest size to those of the largest size in ascending order, with respect to a total number of the particles (assumed as 100%), and is represented as D50". D50 may be measured using, e.g., a particle size analyzer, transmission electron microscopic (TEM) image, or a scanning electron microscopic (SEM) image. Alternatively, D50 may be obtained by measuring with a dynamic light scattering instrument, data analysis to count the number of particles in size ranges, and an average diameter calculation based on the results from the data analysis.

According to an embodiment, the coating layer including $Li_3VO_4$ may be on a surface of the core in the positive active material.

The overlithiated lithium transition metal oxide with the coating layer of or including $Li_3VO_4$ may provide improved lifetime characteristics, e.g., at a high voltage.

In the overlithiated lithium transition metal oxide, the $LiMO_2$ phase may be involved in charging and discharging at a low voltage (<4.4V), and the $Li_2MnO_3$ phase may be involved in charging and discharging at a high voltage (>4.4V). Due to the presence of Mn of $Li_2MnO_3$ in a tetravalent state during high-voltage charging, Mn may not be oxidized any longer with elimination of lithium, and oxygen may lose electrons. This may destabilize the structure of the overlithiated lithium transition metal oxide and may cause generation of oxygen gas on the surface thereof, and consequently may lead to a reduction in lifetime. When the overlithiated lithium transition metal oxide is coated with $Li_3VO_4$, the generation of $O_2$ gas on the surface thereof during high-voltage operation may be suppressed, and consequently, the structure of the overlithiated lithium transition metal oxide may be stabilized, and lifetime characteristics thereof may be improved. The suppression of $O_2$ gas generation on the surface of the overlithiated lithium transition metal oxide by coating with $Li_3VO_4$ may be experimentally observed, as will be described below.

In an implementation, the coating layer of the positive active material may be a uniform, continuous coating layer.

In an implementation, the coating layer of the positive active material may be an island-type, discontinuous coating layer. As used herein, the term "island-type" may refer to a spherical, semispherical, non-spherical, or amorphous shape having a volume, but is not limited to these specific shapes. The island-type coating layer may include discontinuous coating layers of particles, or irregular discontinuous coating layers of agglomerated particles in volumes.

In an implementation, the coating layer of the positive active material may be on or may cover a defective surface region of primary particles of the core. For example, if the positive active material is washed with water to remove the coating layer, a defective surface region, e.g., cracks, may appear on the surface of the core from which the coating layer was removed.

In an implementation, the coating layer of the positive active material may include coating particles including $Li_3VO_4$. The coating particles of the coating layer may have an average particle diameter of about 10 nm to about 100 nm. In an implementation, the coating particles of the coating layer may have an average particle diameter of about 20 nm to about 80 nm, e.g., about 40 nm to about 60 nm. The coating particles of the coating layer may be linked to one another to form a continuous coating layer, e.g., without boundaries. In an implementation, the coating particles of the coating layer may form a discontinuous coating layer, e.g., not completely coating the core of the positive active material.

An amount of vanadium (V) of $Li_3VO_4$ in the coating layer may be less than about 1.25 mole %, based on 1 mole of the total transition metal contained in the core. In an implementation, the amount of V of $Li_3VO_4$ in the coating layer may be, e.g., about 0.1 mole % to about 1.2 mole % or about 0.5 mole % to about 1 mole %, based on 1 mole of the total transition metal contained in the core. When the amount of V of $Li_3VO_4$ in the coating layer is within these ranges, the positive active material may have a certain or desired level of capacity.

As described above, the positive active material including the overlithiated lithium transition metal oxide and the coating layer including $Li_3VO_4$ may have improved lifetime characteristics.

According to another embodiment, a method of preparing a positive active material may include, e.g., mixing a transition metal precursor, a lithium precursor, a fluorine compound (e.g., a fluorine-containing compound), and a vanadium source to form a mixed starting material for preparing an overlithiated lithium transition metal oxide; and thermally treating the mixed starting material.

In an implementation, the transition metal precursor may include $Ni_bCo_cMn_d(OH)_y$, in which $b+c+d=1$, $0<b<1$, $0<c<1$, $0<d<1$, and $y=2\pm0.2$.

In an implementation, the transition metal precursor may further include at least one selected from, e.g., a cation (M) of, titanium (Ti), vanadium (V), aluminum (Al), magnesium (Mg), chromium (Cr), iron (Fe), zirconium (Zr), rhenium (Re), boron (B), germanium (Ge), ruthenium (Ru), tin (Sn), niobium (Nb), molybdenum (Mo), and platinum (Pt). The at least one, e.g., cation, may be provided in a hydroxide or oxide form in preparing the transition metal precursor, and may be uniformly mixed in the transition metal precursor. For example, the transition metal precursor including at least one metal anion may be represented by $Ni_bCo_cMn_dM_f(OH)_y$, in which $b+c+d++f=1$, $0<b<1$, $0<c<1$, $0<d<1$, $0<f<1$, and $y=2\pm0.2$.

In an implementation, the lithium precursor may include at least one selected from LiOH and $Li_2Co_3$.

Including the fluorine compound in the mixed starting material may help improve initial efficiency of a lithium battery.

The fluorine compound may include at least one selected from lithium fluoride (LiF), magnesium fluoride ($MgF_2$), strontium fluoride ($SrF_2$), beryllium fluoride ($BeF_2$), calcium fluoride ($CaF_2$), ammonium fluoride ($NH_4F$), ammonium bifluoride ($NH_4HF_2$), and ammonium hexafluoroaluminate (($NH_4)_3AlF_6$).

A precursor mixture of the lithium precursor and the fluorine compound may be mixed with the vanadium source to coat the precursor mixture with $Li_3VO_4$. The vanadium source for forming $Li_3VO_4$, may include at least one selected from ammonium metavanadate ($NH_3VO_4$), sodium metavanadate ($NaVO_3$), potassium metavanadate ($KVO_3$), vanadium oxide ($V_2O_5$, $V_2O_4$, $V_2O_3$, or $V_3O_4$), vanadium oxytrichloride ($VOCl_3$), vanadium tetrachloride ($VCl_4$), and vanadium trichloride ($VCl_3$).

The mixed starting material for preparing the overlithiated lithium transition metal oxide may include the above compounds in stoichiometric amounts, depending on the desired composition of the target positive active material.

The positive active material may be prepared from the mixed starting material through a solid phase reaction.

In an implementation, the thermal treatment may be performed in air and at a temperature of about 400° C. to about 1,000° C., e.g., at a temperature of about 650° C. to about 900° C. The thermal treating may be performed for about 5 hours to about 20 hours.

Vanadium ions may be unlikely to be within the lattice structure of the positive active material. The thermal treating may be sufficient to form the coating layer including $Li_3VO_4$ on the surface of the core (that includes the overlithiated lithium transition metal oxide), without performing a separate coating process. This simple process of forming the coating layer may help reduce the preparation costs of the positive active material.

According to another embodiment, a positive electrode may include the positive active material according to the above-described embodiments.

The positive electrode may be manufactured as follows: For example, the positive active material according to the above-described embodiments, a conducting agent, a binder, and a solvent may be mixed to prepare a positive electrode slurry composition. The positive electrode slurry composition may be directly coated on a positive current collector and then dried to obtain a positive electrode plate with a positive active material film. In an implementation, the positive electrode slurry composition may be cast on a separate support to form a positive active material film, which may then be separated from the support and laminated on an aluminum current collector to prepare a positive electrode plate with the positive active material film.

Examples of the conducting agent may include carbon black, graphite particulates, natural graphite, artificial graphite, acetylene black, ketjen black, carbon fibers, metallic materials, such as copper, nickel, aluminum, silver, or the like, in powder, fiber, or tube form, and a conductive polymer such as polyphenylene derivatives. In an implementation, a suitable conducting agent may be used.

Examples of the binder may include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. Examples of the solvent may include N-methyl-pyrrolidone (NMP), acetone, and water. In an implementation, a suitable material available for these purposes may be used.

In an implementation, a plasticizer may be further added into the positive electrode slurry composition to form a positive electrode plate with pores.

Amounts of the positive active material, the conducting agent, the binder, and the solvent may be those levels that are suitably used in the manufacture of lithium batteries. In an implementation, at least one selected from the conducting agent, the binder, and the solvent may be omitted, depending on the use and the structure of the lithium battery.

The positive electrode may include the positive active material according to the above-described embodiments alone or may further include another suitable positive active material having at least one different characteristic from the above-described positive active material, e.g., a composition or particle diameter.

For example, the other positive active material may include a lithium-containing metal oxide. In an implementation, the other positive active material may include at least one lithium composite oxide of a metal selected from cobalt (Co), manganese (Mn), nickel (Ni), and a combination thereof, e.g., a compound represented by one of the following formulae: $Li_aA_{1-b}B_bD_2$ (where $0.90 \leq a \leq 1$ and $0 \leq b \leq 0.5$); $Li_aE_{1-b}B_bO_{2-c}D_c$ (where $0.90 \leq a \leq 1$, $0 \leq b \leq 0.5$, and $0 \leq c \leq 0.05$); $LiE_{2-b}B_bO_{4-c}D_c$ (where $0 \leq b \leq 0.5$ and $0 \leq c \leq 0.05$); $Li_aNi_{1-b-c}Co_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$:

In the formulae above, A may be selected from the group of nickel (Ni), cobalt (Co), manganese (Mn), and combinations thereof; B may be selected from the group of aluminum (Al), nickel (Ni), cobalt (Co), manganese (Mn), chromium (Cr), iron (Fe), magnesium (Mg), strontium (Sr), vanadium (V), a rare earth element, and combinations thereof; D may be selected from the group of oxygen (O), fluorine (F), sulfur (S), phosphorus (P), and combinations thereof; E may be selected from the group of cobalt (Co), manganese (Mn), and combinations thereof; F may be selected from the group of fluorine (F), sulfur (S), phosphorus (P), and combinations thereof; G may be selected from the group of aluminum (Al), chromium (Cr), manganese (Mn), iron (Fe), magnesium (Mg), lanthanum (La), cerium (Ce), strontium (Sr), vanadium (V), and combinations thereof; Q may be selected from the group of titanium (Ti), molybdenum (Mo), manganese (Mn), and combinations thereof; I may be selected from the group of chromium (Cr), vanadium (V), iron (Fe), scandium (Sc), yttrium (Y), and combinations thereof; and J may be selected from the group of vanadium (V), chromium (Cr), manganese (Mn), cobalt (Co), nickel (Ni), copper (Cu), and combinations thereof.

For example, the other positive active material may include at least one selected from $LiCoO_2$, $LiMn_xO_{2x}$ (where x=1 or 2), $LiNi_{1-x}Mn_xO_{2x}$ (where $0 < x < 1$), $LiNi_{1-x-y}Co_xMn_yO_2$ (where $0 \leq x \leq 0.5$ and $0 \leq y \leq 0.5$), and $FePO_4$.

The compounds listed above as the other positive active materials may include a surface coating layer. In an implementation, a mixture of a compound without a surface coating layer and a compound having a surface coating layer, the compounds being selected from the compounds listed above, may be used. The surface coating layer may include at least one compound of a coating element selected from the group of oxide, hydroxide, oxyhydroxide, oxycarbonate, and hydroxycarbonate of the coating element. The compounds for the surface coating layer may be amorphous or crystalline. The coating element for the surface coating layer may include, e.g., magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The surface coating layer may be formed using a suitable method that does not adversely affect the physical properties of the positive active material when a compound of the coating element is used. For example, the surface coating layer may be formed using a spray coating method, a dipping method, or the like.

The positive electrode current collector may have a thickness of about 3 μm to about 500 μm. The positive electrode current collector may include a suitable material that has a suitable conductivity without causing chemical changes in the fabricated battery. Examples of the positive electrode current collector may include copper, stainless steel, aluminum, nickel, titanium, sintered carbon, copper or stainless steel that is surface-treated with carbon, nickel, titanium or silver, and aluminum-cadmium alloys. In addition, the positive electrode current collector may be processed to have fine irregularities on surfaces thereof so as to enhance adhesive strength of the current collector to the negative active material, and may be used in any of various forms including films, sheets, foils, nets, porous structures, foams, and non-woven fabrics.

The positive electrode may have a mixture density of at least about 2.0 g/cc.

According to another embodiment, a lithium battery may include a positive electrode including the positive active material according to the above-described embodiments. For example, the lithium battery may include a positive electrode including the positive active material according to the above-described embodiments, a negative electrode opposite to the positive electrode, and an electrolyte between the positive electrode and the negative electrode.

The positive electrode of the lithium battery may be manufactured according the method described above.

The negative electrode may be manufactured as follows: The negative electrode may be manufactured in the same manner as the positive electrode, except for using a negative active material, instead of the positive active material. A conducting agent, a binder, and a solvent for a negative electrode slurry composition may be the same as those for the positive electrode described above.

For example, a negative active material, a binder, and a solvent, and optionally a conducting agent may be mixed to prepare a negative electrode slurry composition, which may then be directly coated on a negative electrode current collector to manufacture a negative electrode plate. In an implementation, the negative electrode slurry composition may be cast on a separate support to form a negative active material film, which may then be separated from the support and laminated on a negative electrode current collector to manufacture a negative electrode plate.

The negative active material may include a suitable negative active material for lithium batteries. For example, the negative active material may include at least one selected from the group of lithium metal, a metal that is alloyable with lithium, a transition metal oxide, a nontransition metal oxide, and a carbonaceous material.

Examples of the metal alloyable with lithium may include Si, Sn, Al, Ge, Pb, Bi, Sb, a Si—Y alloy (where Y is an alkali metal, an alkali earth metal, a Group 13 element, a Group 14 element, a transition metal, a rare earth element, or a combination thereof except for Si), and a Sn—Y alloy (where Y is an alkali metal, an alkali earth metal, a Group 13 element, a Group 14 element, a transition metal, a rare earth element, or a combination thereof except for Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Examples of the transition metal oxide may include a lithium titanium oxide, a vanadium oxide, and a lithium vanadium oxide.

Examples of the non-transition metal oxide may include $SnO_2$ and $SiO_x$ (where $0<x<2$).

Examples of the carbonaceous material may include crystalline carbon, amorphous carbon, and mixtures thereof. Examples of the crystalline carbon may include graphite, such as natural graphite or artificial graphite that is in amorphous, plate, flake, spherical or fibrous form. Examples of the amorphous carbon include soft carbon (carbon sintered at low temperatures), hard carbon, meso-phase pitch carbides, sintered corks, and the like.

Amounts of the negative active material, the conducting agent, the binder, and the solvent may be those levels that are suitably used in the manufacture of lithium batteries.

The negative electrode current collector may have a thickness of about 3 μm to about 500 μm. The negative electrode current collector may include a suitable material that has suitable conductivity without causing chemical changes in the battery. For example, the negative electrode current collector may include copper, stainless steel, aluminum, nickel, titanium, sintered carbon, copper or stainless steel that is surface-treated with carbon, nickel, titanium or silver, and aluminum-cadmium alloys. In an implementation, the negative electrode current collector may be processed to have fine irregularities on surfaces thereof so as to enhance adhesive strength of the negative active material thereto, and may be used in any of various forms, including films, sheets, foils, nets, porous structures, foams, and non-woven fabrics.

The positive and negative electrodes may be separated from each other by a separator. A suitable separator that is used for lithium batteries may be used. In an implementation, the separator may have low resistance to migration of ions in an electrolyte and a high electrolyte-retaining ability. Examples of the separator may include glass fiber, polyester, Teflon, polyethylene, polypropylene, polytetrafluoroethylene (PTFE), and a combination thereof, each of which may be a nonwoven fabric or a woven fabric. The separator may have a pore diameter of about 0.01 to about 10 μm and a thickness of about 5 to about 300 μm.

A lithium salt-containing non-aqueous electrolyte may include a non-aqueous electrolyte solution and a lithium salt. The non-aqueous electrolyte may be a non-aqueous liquid electrolyte, an organic solid electrolyte, or an inorganic solid electrolyte.

Examples of the non-aqueous liquid electrolyte may include aprotic organic solvents such as N-methyl-2-pyrrolidone, propylene carbonate, ethylene carbonate (EC), butylene carbonate, dimethyl carbonate, diethyl carbonate (DEC), fluoroethylene carbonate (FEC), γ-butyrolactone, 1,2-dimethoxy ethane, tetrahydroxyfuran, 2-methyl tetrahydrofuran, dimethylsulfoxide, 1,3-dioxolane, formamide, dimethylformamide, nitromethane, methyl formate, methyl acetate, phosphoric acid trimester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, PVDF, and polymers containing ionic dissociation groups.

Examples of the inorganic solid electrolyte may include nitrides, halides, sulfates, and silicates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt may include a suitable lithium salt that is soluble in the above-mentioned non-aqueous electrolyte. For example, the lithium salt may include at least one selected from among LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenylborate, or the like, and combinations thereof.

Lithium batteries may be classified as, e.g., lithium ion batteries, lithium ion polymer batteries, or lithium polymer batteries, according to the type of separator and/or electrolyte included therein. In addition, lithium batteries may be classified as, e.g., cylindrical type, rectangular type, coin type, or pouch type, according to the shape thereof. Lithium batteries may also be classified as, e.g., either bulk type or thin film type, according to the size thereof. In addition, lithium primary batteries and lithium secondary batteries are available.

FIG. 1 illustrates a schematic perspective view of a structure of a lithium battery 30 according to an embodiment.

Referring to FIG. 1, the lithium battery 30 may include a positive electrode 23, a negative 22, and a separator 23 between the positive electrode 23 and the negative electrode 22. The positive electrode 23, the negative electrode 22, and the separator 24 may be wound or folded, and then encased in a battery case 25. Subsequently, an electrolyte may be injected into the battery case 25, followed by sealing the battery case 25 with a cap assembly member 26, thereby completing the manufacture of the lithium battery 30. The battery case 25 may have a cylindrical shape, a rectangular shape, or a thin-film shape. The lithium battery 30 may be a lithium ion battery.

The lithium battery 30 may be suitable for use as power sources for electric vehicles and power tools requiring high capacity, high-power output, and operation under high temperature conditions, in addition to power sources for mobile phones and portable computers, and may be coupled to internal combustion engines, fuel cells, or super-capacitors to be used in hybrid vehicles. In an implementation, the lithium battery 30 may be used in applications that require high-power output, high voltage, and operation under high temperature conditions, e.g., in electric bicycles, electric tools, or other electric applications.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1: Preparation of Positive Active Materials

Positive active materials as overlithiated lithium transition metal oxides (OLO) ($Li[Li_{1/6}Ni_{1/6}Co_{1/6}Mn_{1/2}]O_{1.95}F_{0.05}$) having a $Li_3VO_4$ coating layer thereon were prepared as follows.

First, 50 g of $Ni_{0.2}Co_{0.2}Mn_{0.6}(OH)_2$, 26.78 g of $Li_2CO_3$, 0.78 g of LiF, and $NH_4VO_3$ were mixed to obtain a mixed solution. To determine an optimal coating amount of the $Li_3VO_4$ coating layer, an amount of $NH_4VO_3$ was varied to adjust the amount of vanadium (V) to about 0.5 mole %, about 1 mole %, about 1.25 mole %, and about 1.5 mole %, based on 1 mole of the total amount of the transition metals (e.g., Ni, Co, and Mn in the to-be-formed core).

The mixed solution was thermally treated at about 700° C. in air for about 10 hours while stirring. After completion of the thermal treatment, the resulting product was filtered in a vacuum to remove the solvent, and then dried at about 120° C., to obtain the OLO active material having the $Li_3VO_4$ coating layer.

Example 2: Manufacture of Coin Half-Cells

To identify the electrochemical characteristics of the OLO active material with respect to the coating amount of $Li_3VO_4$, coin half-cells were manufactured as follows:

Each of the OLO active materials of Example 1 and a carbon conducting agent (Super-P; Timcal Ltd.) were uniformly mixed in a weight ratio of about 90:5, and then a PVDF binder solution was added thereto to prepare a positive electrode slurry containing the positive active material, the carbon conducting agent, and the binder in a weight ratio of about 92:4:4.

The positive electrode slurry was coated on a 15 μm-thick aluminum foil and then dried to form a positive electrode plate. Then, the positive electrode plate was further dried in a vacuum to manufacture a coin half cell (2032 type) having a diameter of about 12 mm.

In manufacturing the coin half cell, metallic lithium as a counter electrode, a polypropylene separator (Celgard 3501), and an electrolyte including 1.3 M $LiPF_6$ dissolved in a mixed solvent of ethylene carbonate (EC) and diethylcarbonate (DEC) in a 3:7 volume ratio were used.

Example 3: Manufacture of Coin Full-Cells

Each of the OLO active materials of Example 1 and a carbon conducting agent (Super-P; Timcal Ltd.) were uniformly mixed in a weight ratio of about 90:5, and then a PVDF binder solution was added thereto to prepare a positive electrode slurry containing the positive active material, the carbon conducting agent, and the binder in a weight ratio of about 92:4:4. The positive electrode slurry was coated on a 15 μm-thick aluminum foil, dried, and then roll-pressed to form a positive electrode.

Graphite powder as a negative electrode active material and PVDF as a binder were mixed in a weight ratio of 1:1, and then about 60 wt % of N-methylpyrrolidone (on a solid content basis) was added to the mixture, thereby preparing a negative electrode slurry. The negative electrode slurry was coated on a copper foil current collector having a thickness of 10 μm, dried, and then roll-pressed to manufacture a negative electrode.

With a polyethylene separator (STAR20, available from Asahi) having a thickness of about 20 μm between the positive electrode and the negative electrode, an electrolyte was injected, thereby manufacturing a coin full-cell (18650 type). The electrolyte used was prepared by adding about 0.5 wt % of tris(trimethylsilyl)phosphate, based on a total weight of the electrolyte, to a mixture of fluoroethylene carbonate, dimethylcarbonate, and 2,2,3,3-tetrafluoropropyl-1,1,2,2-tetrafluoroethyl ether as a fluoroether solvent in a volume ratio of about 25:72:3.

Evaluation Example 1

Scanning Electron Microscopic (SEM) Analysis

One of the OLO active materials of Example 1 (that was coated with 1 mole % of (V)) was analyzed at a high magnification by SEM before and after washing. The SEM images of the OLO active material before and after washing are shown in FIGS. 2 and 3, respectively.

Figure 2:
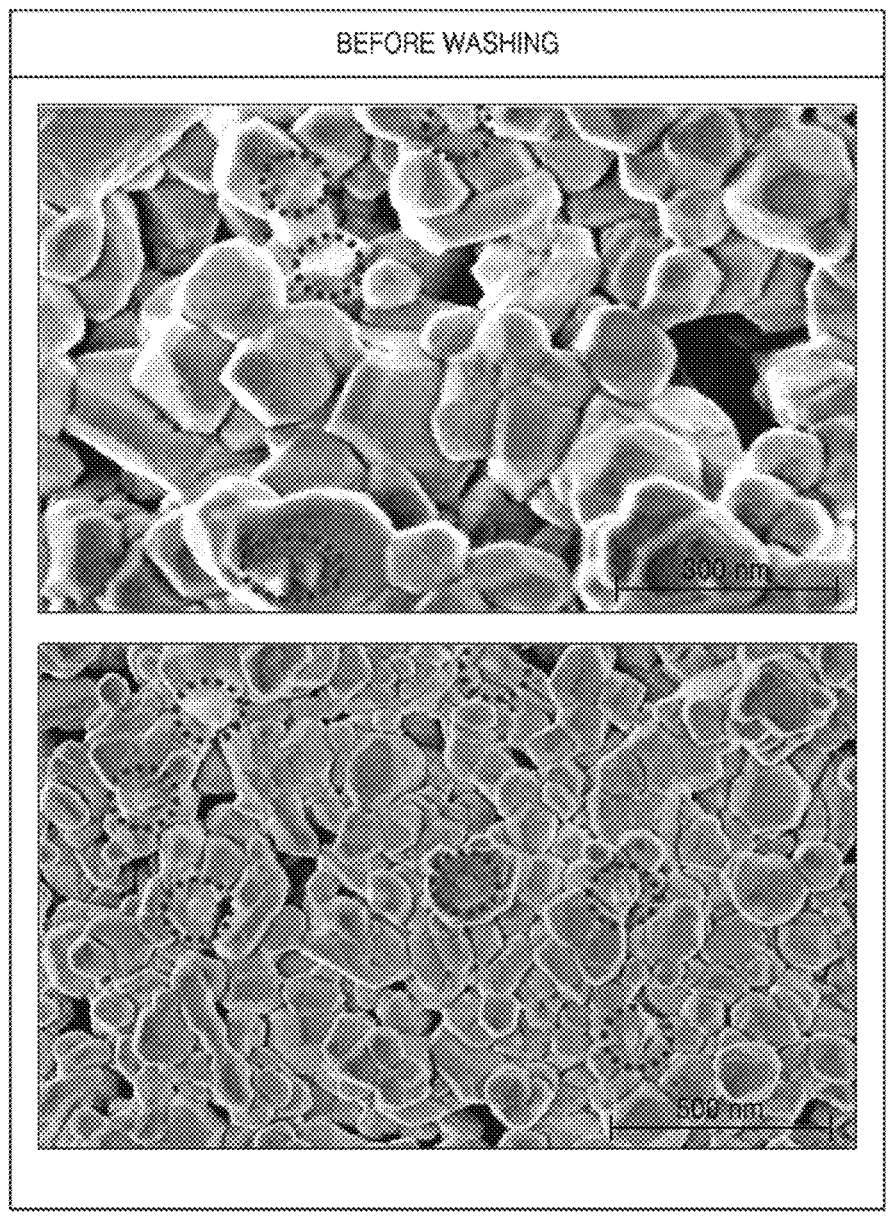
FIG. 2 illustrates a scanning electron microscopic (SEM) image at a high magnification of an overlithiated lithium transition metal oxide (OLO) active material of Example 1 before washing.
Figure 3:
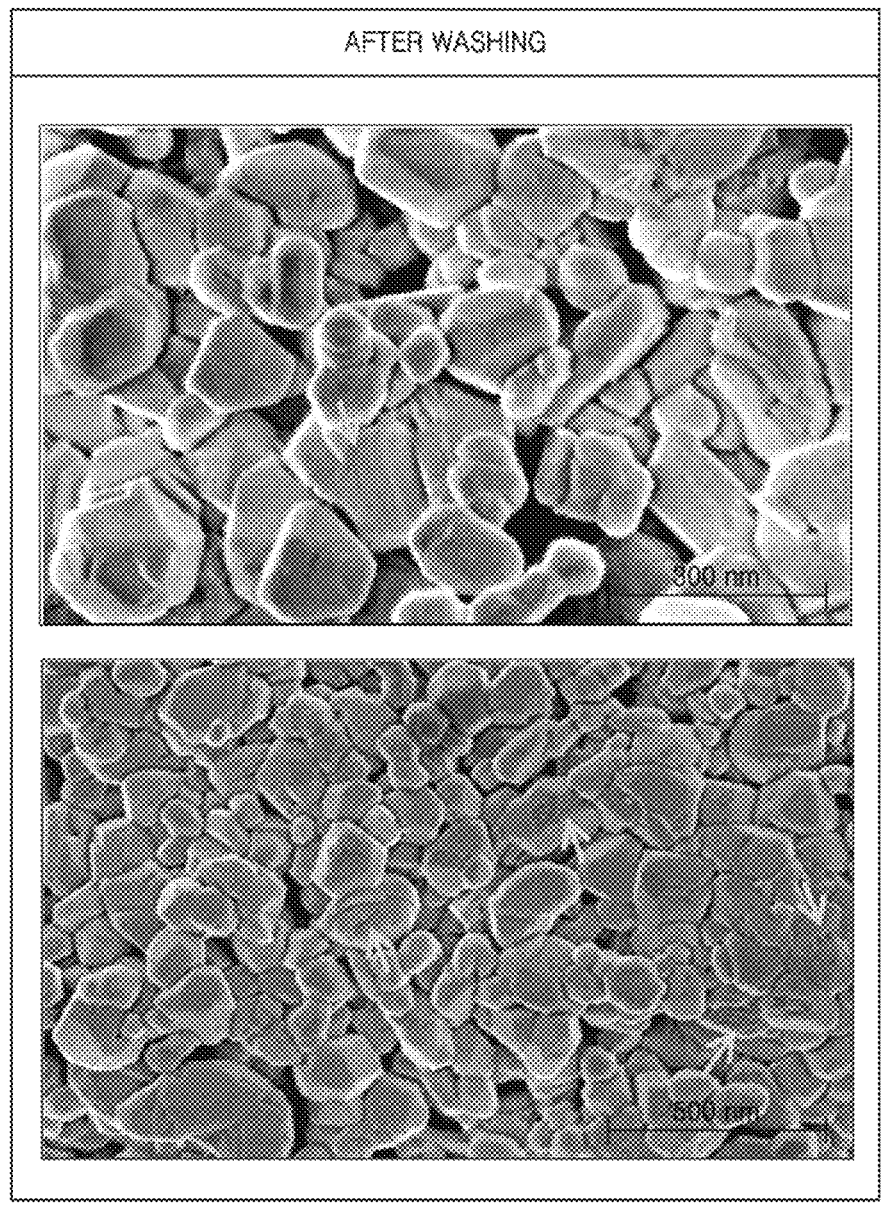
FIG. 3 illustrates a SEM image at a high magnification of the OLO active material of Example 1 after washing.

Referring to FIG. 2, the OLO active material before washing was observed to have island-type coating layers on surfaces thereof. Referring to FIG. 3, when the $Li_3VO_4$ was washed off with water, the island-type coating layers disappeared from the surfaces of the OLO active material, and crack-like defects appeared on the surface regions of the OLO active material from which the $Li_3VO_4$ coating layers were washed off. This indicates that generation of oxygen gas from the surfaces of the OLO active material may be suppressed by coating defective surface regions of the OLO active material (that have structurally relatively low stability), with the $Li_3VO_4$ coating layers.

Evaluation Example 2

X-Ray Diffraction (XRD) Test

Figure 4:
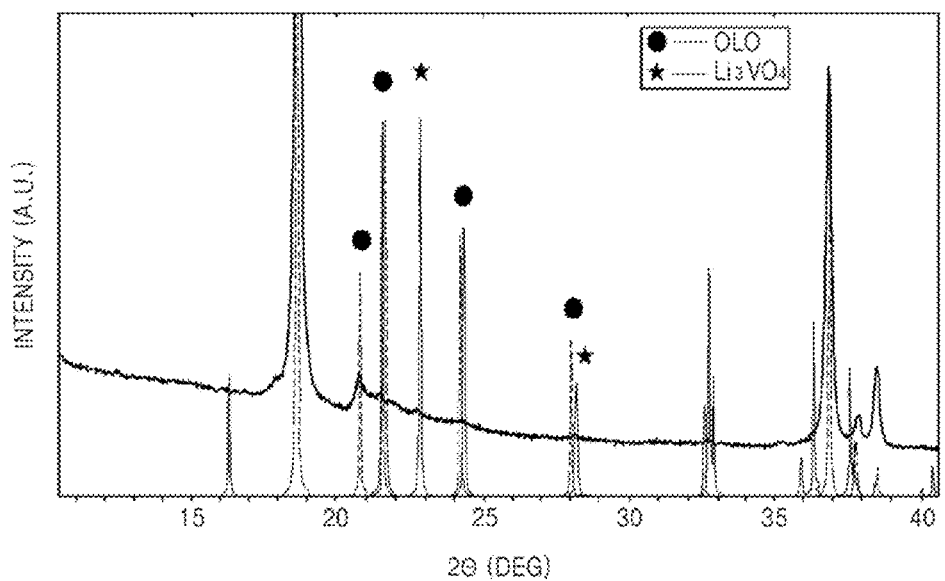
FIG. 4 illustrates an X-ray diffraction pattern of the OLO active material of Example 1.

An XRD pattern of the OLO active material of Example 1 (coated with 1 mole % of vanadium (V)) was measured using CuKα rays. The results are shown in FIG. 4. Referring to FIG. 4, peaks of the OLO active material and $Li_3VO_4$ phase appeared.

Figure 5:
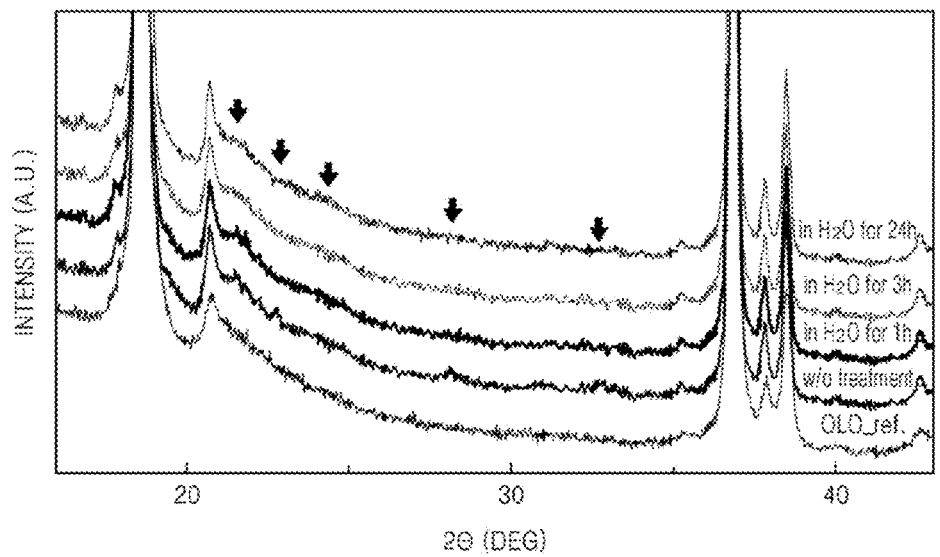
FIG. 5 illustrates X-ray diffraction patterns of the OLO active material of Example 1 after washing for 1 hour, 3 hours, and 24 hours to remove a coating layer of $Li_3VO_4$.

To verify again the formation of the $Li_3VO_4$ coating layers on the surfaces of the OLO active material, the OLO active material with the $Li_3VO_4$ coating layers was washed with water ($H_2O$) for about 1 hour, 3 hours, and 24 hours, and then subjected to XRD analysis. The results are shown in FIG. 5. Referring to FIG. 5, peaks of the $Li_3VO_4$ coating layers disappeared in the OLO active material washed for about 1 hour.

Evaluation Example 3

Evaluation of Initial Efficiency and Rate Characteristics with Respect to Coating Amount To evaluate the electrochemical characteristics of the OLO active material with respect to the coating amount of $Li_3VO_4$, initial efficiencies, capacities, and rate characteristics of the coin half-cells of Example 2 were measured and compared with those of an OLO active material with no coating layers (OLO-ref). The results are shown in Table 1, below.

A charge-discharge test of the 2032 coin half-cells of Example 2 using lithium metal as negative electrodes was performed. A LL of the positive electrode was fixed to about 5.0~5.5 $mg/cm^2$. Charge and discharge capacities at a $1^{st}$ cycle for a formation process were measured by charging with a current of 0.1 C to a voltage of about 4.7 V charge (CC mode) and discharging with a current of 0.1 C to about 2.5 V discharge (CC mode). For rate characteristics evaluation, after charging with a constant current of about 0.5 C to a voltage of 4.6 V (CC-CV mode, 0.05 C cut-off), discharging was performed with a current of 0.2, 0.33, 1, 2, and 3 C at a voltage of 2.5 V (CC mode) to measure discharge capacities. An initial efficiency (IE) was defined as a ratio of the discharge capacity at the $1^{St}$ cycle to the charge capacity at the $1^{st}$ cycle. The rate characteristics of a coin half-cell were defined as a ratio of discharge capacities, as shown in Table 1 below.

V (with respect to Li) and then with a constant voltage of about 4.3 V to a current of 0.02 C, followed by discharging with a constant current of 0.2 C to a voltage of about 2.75 V (with respect to Li) (formation process).

Subsequently, each of the coin half-cells that underwent the formation process was charged with a constant current of 0.5 C rate at about 60° C. to a voltage of about 4.3 V (with respect to Li), and then with a constant voltage of about 4.3 V to a current of about 0.02 C, followed by discharging with a constant current of about 0.e C to a voltage of about 2.75 V (with respect to Li). This cycle of charging and discharging was repeated 40 times.

Figure 6:
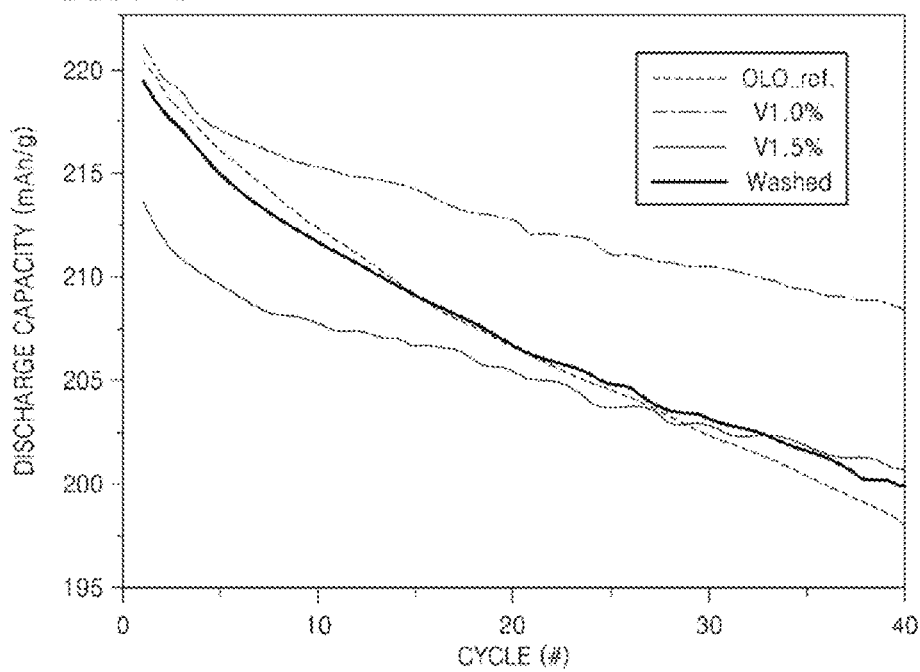
FIG. 6 illustrates a graph of discharge capacities with respect to the number of cycles in coin half-cells manufactured using coated and non-coated core materials.

The discharge capacities of each of the coin half-cells with respect to the number of cycles are shown in FIG. 6.

Referring to FIG. 6, the coin half-cells including the OLO active materials with the $Li_3VO_4$ coating layers were found to have improved lifetime characteristics, compared to the coin half-cell including the non-coated OLO active material. The coin half-cell including OLO active material washed to remove the $Li_3VO_4$ coating layers had similar lifetime characteristics as those of the coin half-cell including non-coated OLO active material. The coin half-cell including OLO active material including a high (V) coating amount, of 1.5 mole %, had a higher capacity retention rate at $40^{th}$ cycle than the other OLO active materials, but lower absolute values of discharge capacities due to the high (V) coating amount.

TABLE 1

| Sample Name | $1^{st}$ cycle | | | | Rate Characteristics | | | | | | |
|---|---|---|---|---|---|---|---|---|---|---|---|
| | 0.1C (mAh/g) | 0.1D (mAh/g) | I.E. (%) | 0.2D (mAh/g) | 0.33D (mAh/g) | 1D (mAh/g) | 2D (mAh/g) | 3D (mAh/g) | 1D/0.1D (%) | 2D/0.2D (%) | 3D/0.33D (%) |
| OLO-ref | 315 | 285 | 90.5 | 261 | 253 | 234 | 213 | 202 | 82 | 82 | 80 |
| OLO @V 0.5 | 309 | 284 | 92.0 | 261 | 253 | 232 | 211 | 195 | 82 | 81 | 77 |
| OLO @V 1.0 | 309 | 285 | 92.1 | 261 | 252 | 232 | 212 | 196 | 81 | 81 | 78 |
| OLO @V 1.25 | 299 | 265 | 88.7 | 244 | 236 | 213 | 192 | 178 | 80 | 79 | 75 |
| OLO @V 1.5 | 304 | 267 | 87.9 | 242 | 232 | 204 | 180 | 164 | 76 | 74 | 71 |

Referring to Table 1, the initial efficiencies and rate characteristics of the coin half-cells including the OLO active materials having a coating with a (V) content of less than or equal to about 1 mole % were similar to those of the coin half-cells including the OLO active material not coated with a (V)-containing compound. However, with an increased (V) coating amount of about 1.25 mole % or greater, the electrochemical characteristics of the coin half-cell were deteriorated.

Evaluation Example 4

Evaluation of Lifetime Characteristics

To evaluate the lifetime characteristics of the non-coated OLO active material (OLO-ref), the $Li_3VO_4$-coated OLO active material including 1 mole % of (V), the $Li_3VO_4$-coated OLO active material including 1.5 mole % of (V), and the OLO active material coated with $Li_3VO_4$ and washed with water for about 3 hours, coin half-cells were manufactured using these OLO active materials in the same manner as in Example 2.

Each of the coin half-cells was charged with a constant current of 0.2 C rate at about 25° C. to a voltage of about 4.3

Coin full-coin cells were manufactured using the non-coated OLO active material (ref.) and the $Li_3VO_4$-coated OLO active material having a (V) content in the coating of 1 mole %, respectively, in the same manner as in Example 3. Charging and discharging cycles were performed 300 times using each of the coin full cells under the same conditions as described above.

Figure 7:
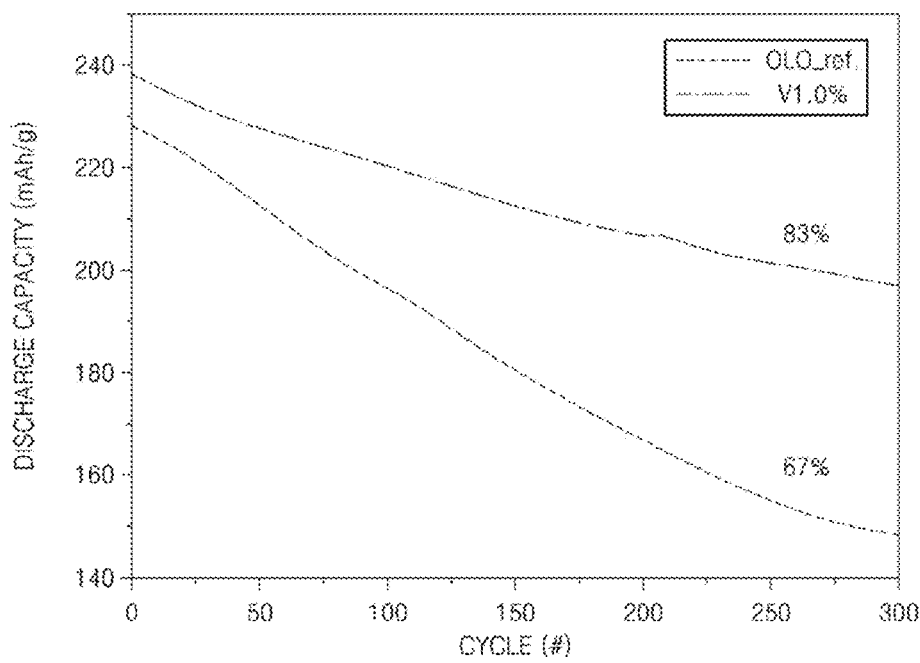
FIG. 7 illustrates a graph of discharge capacities with respect to the number of cycles in coin full-cells manufactured using coated and non-coated core materials.

The discharge capacities of the coin full-cells with respect to the number of cycles are shown in FIG. 7.

Referring to FIG. 7, the coin full-cell including OLO active material with the $Li_3VO_4$ coating layers were found to have remarkably improved lifetime characteristics, compared to those of the coin full-cell including non-coated OLO active material. After the $300^{th}$ cycle, the coin full-cell including OLO active material with the $Li_3VO_4$ coating layers had a capacity retention rate of about 83%, while the coin full-cell including non-coated OLO active material had a capacity retention rate of merely about 67%.

The capacity retention rate is defined as Equation 1 below:

Capacity retention rate (%)=[Discharge capacity at each cycle/Discharge capacity at the $1^{st}$ cycle]× 100   <Equation 1>

Evaluation Example 5

Analysis of Effects of Core Material and Coating

An NCM active material (LiNi$_{0.5}$Co$_{0.2}$Mn$_{0.3}$O$_2$) having a Li$_3$VO$_4$ coating layer was prepared in the same manner as the preparing of the OLO active material with the Li$_3$VO$_4$ coating layers on surfaces thereof in Example 1. Capacity retention rates (CRRs) and the amounts of O$_2$ generation with respect to the types of core materials and coating were measured. The results are shown in Table 2, below.

The CRRs and the amounts of O$_2$ generation were measured using coin full-cells that were manufactured using the Li$_3$VO$_4$-coated OLO active material and the Li$_3$VO$_4$-coated NCM active material, respectively, in the same manner as in Example 3. The coin full-cells were subjected to charging and discharging under the same conditions as in Evaluation Example 4 to measure CRRs at the 100$^{th}$ cycle. The amounts of O$_2$ generation of each of the coin full-cells was obtained as follows: First, gases generated in the coin full-cells including the OLO and NCM positive active materials, respectively, were collected and decomposed in oil, and the types and amounts of the gases were identified using gas chromatography. Next, a total volume of the collected gases was multiplied by a volume fraction of O$_2$ gas, and the product was divided by the weight of the positive active material in each of the coin full-cells to quantify the amount of O$_2$ generation.

TABLE 2

| Positive active material | Coating with Li$_3$VO$_4$ | V window (vs. Gr) | CRR @100 cycle | Amount of O$_2$ generation |
|---|---|---|---|---|
| LiNi$_{0.5}$Co$_{0.2}$Mn$_{0.3}$O$_2$ | X | 4.30-2.5 V | 96.2% | 0.02 cc/g |
| (Comparative Reference | | 4.55-2.5 V | 79.3% | 0.03 cc/g |
| Example) | ◯ | 4.30-2.5 V | 98.1% | 0.02 cc/g |
| | | 4.55-2.5 V | 83.9% | 0.01 cc/g |
| OLO active material | X | 4.3-02.5 V | 95.6% | 0.03 cc/g |
| (Li[Li$_{1/6}$Ni$_{1/6}$Co$_{1/6}$Mn$_{1/2}$]O$_{1.95}$F$_{0.05}$) | | 4.55-2.5 V | 78.4% | 0.18 cc/g |
| of Example 1 | ◯ | 4.30-2.5 V | 97.2% | 0.02 cc/g |
| | | 4.55-2.5 V | 92.7% | 0.06 cc/g |

Referring to Table 2, the coin full-cell including the Li$_3$VO$_4$-coated NCM active material was found to have improved lifetime characteristics, but with a minor difference between low-voltage and high-voltage environments. The coin full-cell including the Li$_3$VO$_4$-coated OLO active material was found to have improved lifetime characteristics, e.g., they were more significant in high-voltage environments.

The coin full-cell including the non-coated OLO active materials were found to generate a considerably large amount of O$_2$ when driven at a high voltage, compared to the coin full-cell including the non-coated NCM active material. The coin full-cell including the Li$_3$VO$_4$-coated OLO active material was found to generate a remarkably reduced amount of O$_2$ when driven at a high voltage.

By way of summation and review, positive active materials having various structures have been considered. For example, with a view toward high-capacity batteries, composite oxides have been considered.

An example of the composite oxide may include Li$_2$MO$_3$-LiMeO$_2$ (where M and Me are transition metals) having a layered structure. Such composite oxides having a layered structure may have high capacity characteristics because, compared to other positive active materials, they may allow intercalation/deintercalation of a larger amount of lithium ions.

Such lithium-rich composite oxides may undergo a structural change as lithium is released from Li$_2$MO$_3$ in charging and discharging cycles and a significant capacity reduction, and thus, may not be practically applicable to commercial batteries.

The embodiments provide a positive active material with high capacity and improved lifetime characteristics.

As described above, the coating of the OLO active material with Li$_3$VO$_4$ may help suppress generation of O$_2$ gas during a high voltage operation and may stabilize an OLO structure. Accordingly, the lithium battery including the Li$_3$VO$_4$-coated OLO active material may have improved lifetime characteristics during operation at a high voltage.

As described above, according to an embodiment, a positive active material may include a coating layer of Li$_3$VO$_4$ on a core including overlithiated lithium transition metal oxide to help stabilize the structure of the overlithiated lithium transition metal oxide. A lithium battery including the positive active material may have improved lifetime characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A positive active material, comprising:
   a core, the core including an overlithiated lithium transition metal oxide; and
   a coating layer on the core, the coating layer including Li$_3$VO$_4$,
   wherein an amount of vanadium in Li$_3$VO$_4$ of the coating layer is greater than 0 and less than about 1.25 mole %, based on 1 mole of total transition metal in the core,
   wherein the coating layer includes coating particles that include the Li$_3$VO$_4$, and
   wherein the coating particles have an average particle diameter of about 10 nm to about 100 nm.

2. The positive active material as claimed in claim 1, wherein the overlithiated lithium transition metal oxide is represented by Formula 1:

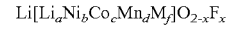   [Formula 1]

wherein, in Formula 1, M comprises at least one selected from titanium (Ti), vanadium (V), aluminum (Al), magnesium (Mg), chromium (Cr), iron (Fe), zirconium (Zr), rhenium (Re), boron (B), germanium (Ge), ruthenium (Ru), tin (Sn), niobium (Nb), molybdenum (Mo), and platinum (Pt), and a, b, c, d, f, and x satisfy the following relations: a+b+c+d+f=1; 0<a<1; 0<b<1; 0<c<1; 0<d<1; 0≤f<1; and 0<x<0.1.

3. The positive active material as claimed in claim 2, wherein, in Formula 1, f>0 and M comprises at least one selected from Ti, V, Al, Mg, Cr, Fe, and Zr.

4. The positive active material as claimed in claim 2, wherein, in Formula 1, a, b, c, d, and f satisfy the following relations: 0.1<a<0.25, 0.1<b<0.4, 0<c<0.2, f=0, and 0.8<(2a+b)/d<1.2.

5. The positive active material as claimed in claim 1, wherein the overlithiated lithium transition metal oxide has an average particle diameter of about 10 nm to about 500 μm.

6. The positive active material as claimed in claim 1, wherein the coating layer is an island-type discontinuous coating layer.

7. The positive active material as claimed in claim 1, wherein the core includes secondary particles including agglomerated primary particles.

8. The positive active material as claimed in claim 1, wherein the coating layer is on a defective surface region of primary particles of the core.

9. A lithium battery comprising a positive electrode, the positive electrode including the positive active material as claimed in claim 1.

10. A method of preparing the positive active material as claimed in claim 1, the method comprising:

mixing a transition metal precursor, a lithium precursor, a fluorine compound, and a vanadium source to prepare a mixed starting material for preparing the overlithiated lithium transition metal oxide; and thermally treating the mixed starting material to form the positive active material.

11. The method as claimed in claim 10, wherein the transition metal precursor includes $Ni_bCo_cMn_dM_f(OH)_y$, where b+c+d++f=1, 0<b<1, 0<c<1, 0<d<1, 0≤f<1, y=2±0.2, and M comprises at least one selected from titanium (Ti), vanadium (V), aluminum (Al), magnesium (Mg), chromium (Cr), iron (Fe), zirconium (Zr), rhenium (Re), boron (B), germanium (Ge), ruthenium (Ru), tin (Sn), neodymium (Nb), molybdenum (Mo), and platinum (Pt).

12. The method as claimed in claim 11, wherein, in the $Ni_bCo_cMn_dM_f(OH)_y$, f=0.

13. The method as claimed in claim 10, wherein the lithium precursor includes at least one selected from LiOH and $Li_2Co_3$.

14. The method as claimed in claim 10, wherein the fluorine compound includes at least one selected from lithium fluoride (LiF), magnesium fluoride ($MgF_2$), strontium fluoride ($SrF_2$), beryllium fluoride ($BeF_2$), calcium fluoride ($CaF_2$), ammonium fluoride ($NH_4F$), ammonium bifluoride ($NH_4HF_2$), and ammonium hexafluoroaluminate (($NH_4)_3AlF_6$).

15. The method as claimed in claim 10, wherein the vanadium source includes at least one selected from ammonium metavanadate ($NH_4VO_3$), sodium metavanadate ($NaVO_3$), potassium metavanadate ($KVO_3$), vanadium oxide ($V_2O_5$, $V_2O_4$, $V_2O_3$, or $V_3O_4$), vanadium oxytrichloride ($VOCl_3$), vanadium tetrachloride ($VCl_4$), and vanadium trichloride ($VCl_3$).

16. The method as claimed in claim 10, wherein thermally treating the mixed starting material is performed in air and at a temperature of about 400° C. to about 1,000° C.

17. The method as claimed in claim 16, wherein thermally treating the mixed starting material is performed at a temperature of about 650° C. to about 900° C.

18. A positive active material, comprising:

a core, the core including an overlithiated lithium transition metal oxide; and a coating layer on the core, the coating layer including $Li_3VO_4$, wherein the coating layer includes coating particles that include the $Li_3VO_4$, and wherein the coating particles have an average particle diameter of about 10 nm to about 100 nm.

* * * * *